United States Patent [19]

Takai et al.

[11] 4,144,701
[45] Mar. 20, 1979

[54] APPARATUS FOR SETTING NIP PRESSURE OF BELTS IN FALSE TWISTER

[75] Inventors: Isao Takai, Komatsushi; Noboru Shindo, Ohmi Hachimanshi, both of Japan

[73] Assignee: Murata Kikai Kabushiki Kaisha, Japan

[21] Appl. No.: 859,392

[22] Filed: Dec. 12, 1977

[30] Foreign Application Priority Data

Dec. 14, 1976 [JP] Japan ............... 51-168148[U]

[51] Int. Cl.² .................... D02G 1/06; D01H 7/92
[52] U.S. Cl. ................................. 57/336; 57/346
[58] Field of Search ............. 57/77.4, 77.45, 34 R, 57/157 R, 157 TS

[56] References Cited

U.S. PATENT DOCUMENTS

| | | | |
|---|---|---|---|
| 2,262,589 | 11/1941 | Peck | 57/77.4 X |
| 2,592,818 | 4/1952 | Moessinger | 57/77.4 |
| 3,045,416 | 7/1962 | Ubbelohde | 57/77.45 |
| 4,012,897 | 3/1977 | Ogura | 57/77.4 |
| 4,047,373 | 9/1977 | Takai | 57/77.4 |

FOREIGN PATENT DOCUMENTS

1083052  9/1967  United Kingdom ............... 57/77.4

*Primary Examiner*—Donald Watkins
*Attorney, Agent, or Firm*—Whittemore, Hulbert & Belknap

[57] ABSTRACT

An apparatus for setting and maintaining the nip pressure at a predetermined level in a false twister where two belts running in opposite directions are crossed in such a state that the surfaces of both the belts are contacted with each other and a yarn is nipped at this crossing point by the two belts to impart false twists to the yarn is disclosed. This nip pressure setting apparatus includes a device for compensating variations of the nip pressure where according to decrease of the nip pressure, at least one of pulleys supporting the belts is moved in a direction approaching to the opposite belt so as to increase the nip pressure and maintain it at a predetermined level.

6 Claims, 7 Drawing Figures

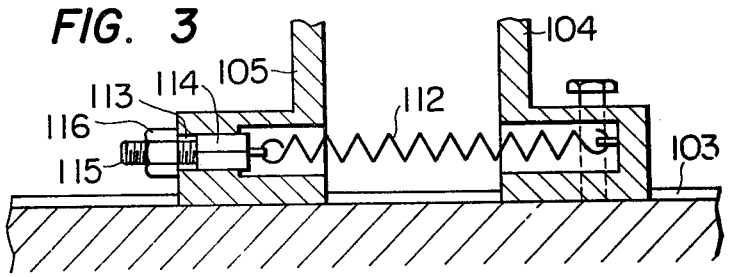
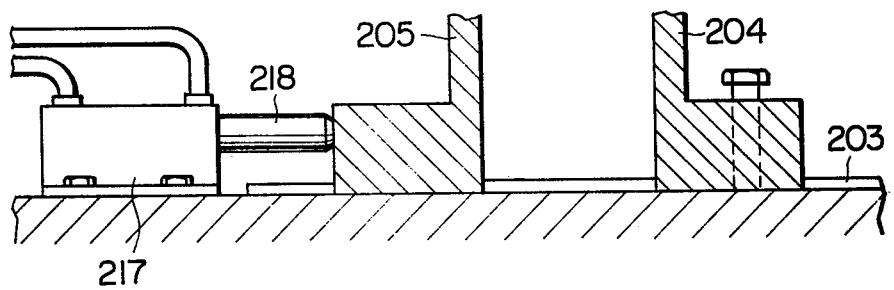
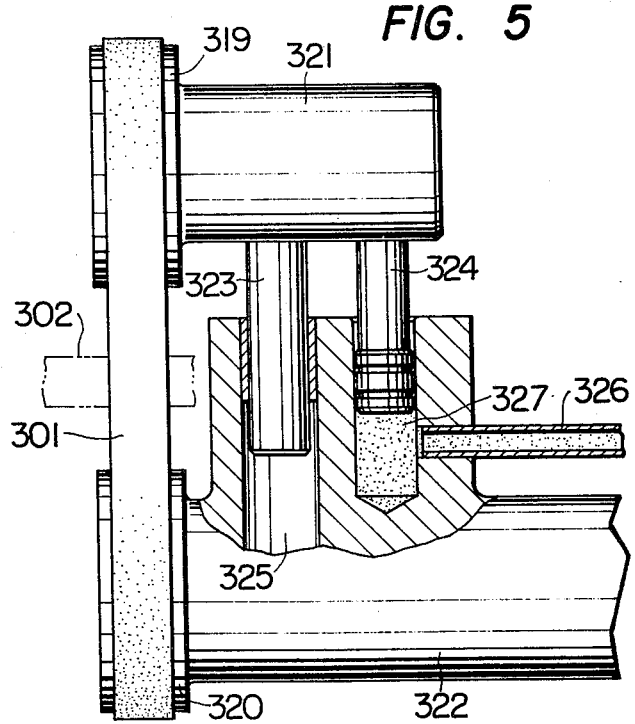

APPARATUS FOR SETTING NIP PRESSURE OF BELTS IN FALSE TWISTER

BACKGROUND OF THE INVENTION (1) Field of the Invention

The present invention relates to an apparatus for setting the nip pressure of belts in a false twister. More particularly, the invention relates to a nip pressure setting apparatus in a false twister in which a pair of endless belts located so that they are crossed in such a state that the surfaces of the belts are contacted with each other, a yarn is nipped on the crossed surfaces of the endless belts, both the endless belts are moved in opposite directions and the yarn is false-twisted by friction of the yarn with the surfaces of the thus moved belts, said nip pressure setting apparatus being arranged so that when the nip pressure is decreased owing to abrasion of the surfaces of the belts or elongation of the belts, the decrease of the nip pressure is precisely compensated and the yarn is always nipped under a constant nip pressure by the surfaces of the belts.

(2) Description of the Prior Art

In conventional false twisters of the type where a yarn is nipped by two endless belts running in opposite directions and the yarn is false-twisted by the two belts, as shown in FIG. 1, a pair of belts 51 and 52 are inclined in opposite directions at the same inclination angle with respect to the running direction of a guided yarn 53 and are arranged to run in opposite directions, and the yarn 53 is nipped and false-twisted between these belts 51 and 52 running in opposite directions at the crossing point where the two belts are crossed and the yarn is contacted with these belts.

In the false twisters of this type, in order to enhance the twisting efficiency while preventing occurrence of slips between the yarn and the surfaces of the belts, it is important to set and maintain the nip pressure of the belts 51 and 52 at a predetermined level. However, the nip pressure is gradually decreased with the lapse of time owing to elongation or abrasion of the belts. Accordingly, development of an apparatus for maintaining the nip pressure at a predetermined certain level has been desired in the art.

SUMMARY OF THE INVENTION

It is therefore a primary object of the present invention to provide an apparatus capable of imparting always a constant number of false twists to a yarn in a false twister of the type where a yarn is nipped between two belts running in opposite directions and the yarn is rotated and twisted by friction of the yarn with the surfaces of the running belts.

Another object of the present invention is to provide an apparatus capable of setting and maintaining a nip pressure of two belts nipping a yarn at a certain predetermined level in a false twister of the type where a yarn is nipped between two belts running in opposite directions and the yarn is rotated and twisted by friction of the yarn with the surfaces of the running belts.

Other objects and advantages of the present invention will be apparent from the detailed description given hereinafter.

BRIEF DESCRIPTION OF THE DRAWING

FIG. 3 is a sectional view showing the main part of a second embodiment of the apparatus of the present invention.

FIG. 4 is a sectional view showing the main part of the apparatus of the present invention.

FIG. 5 is a sectional view showing the main part of a fourth embodiment of the apparatus of the present invention.

DETAILED DESCRIPTION OF THE PREFERRED EMBODIMENTS

The present invention will now be described in detail by reference to embodiments illustrated in the accompanying drawings.

Figure 1:
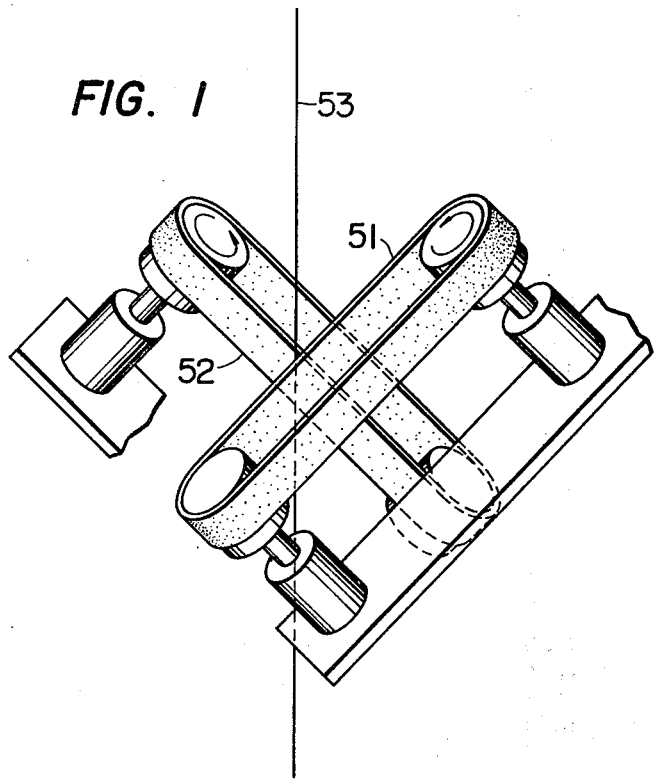
FIG. 1 is a perspective view illustrating diagrammatically the conventional apparatus.
Figure 2:
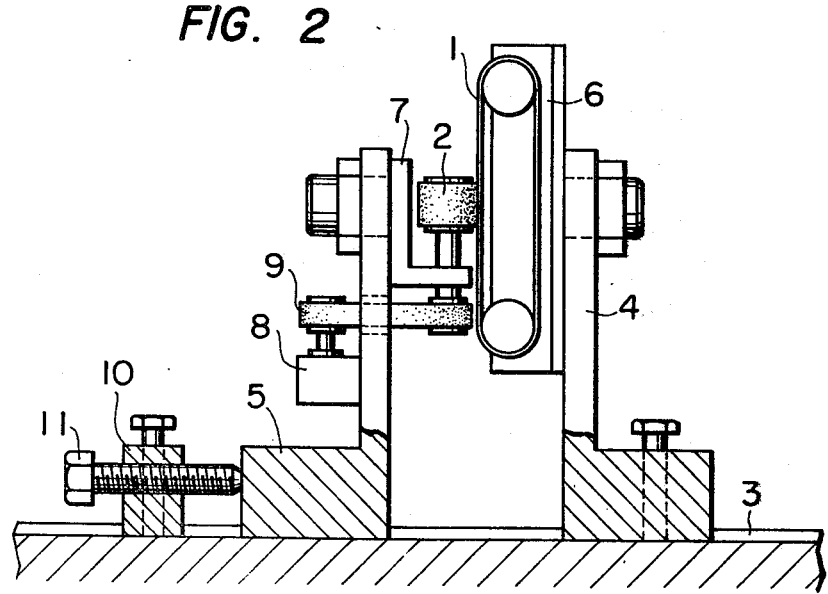
FIG. 2 is a partially sectional front view illustrating a first embodiment of the apparatus of the present invention.

Referring now to FIG. 2, a bracket 4 is fixed to a dovetail groove 3 and a bracket 5 is fitted and supported so that it can slide to the left and right in the dovetail groove 3. A bracket 6 supporting a pair of pulleys between which a belt 1 is laid out and a bracket 7 supporting a pair of pulleys between which a belt 2 is laid out are fixed to the brackets 4 and 5, respectively. A motor 8 is fixed to the bracket 5 to drive the belt 2 through a belt 9 and pulleys. A nut member 10 supporting a bolt 11 is fixed to the dovetail groove 3.

When the bolt 11 is screwed into the nut member 10 and the bracket 5 is pressed to the right by the top end of the bolt 11, the nip pressure of the belts 1 and 2 can be set at a predetermined level. If the nip pressure is reduced below the predetermined level, the nip pressure is corrected by adjusting the quantity of screwing of the bolt 11. In this embodiment, it is necessary to always pay attention to the tension of the belts 1 and 2 and to make the adjustment frequently by turning the bolt 11 on reduction of the nip pressure so as to bring the bracket 5 close to the bracket 4 in the dovetail groove 4.

In a second embodiment illustrated in FIG. 3, a bracket 105 capable of sliding in a direction approaching to a fixed bracket 104 fitted in a dovetail groove 103 is urged by a spring 112. When the nip pressure of belts are decreased, by contraction of the spring 112 the bracket 105 is caused to approach to the bracket 104 and reduction of the nip pressure is compensated. In this embodiment, a square rod 114 capable of sliding to the left and right is fitted in a square hole 113 of the bracket 105, and one end of the spring 112 is supported on said rod 114. A bolt 115 in which a nut 116 is to be screwed is integrally fixed to the square rod 114, and the initial nip pressure is set by adjusting the urging force of the spring 112 by the nut 116 and large reduction of the nip pressure can be compensated by further turning the nut 116.

In a third embodiment illustrated in FIG. 4, the means for moving the sliding bracket 5 or 105 in the first and second embodiments is modified. More specifically, in this third embodiment, a certain pressure is applied to urge a sliding bracket 205 fitted in a dovetail groove 203 toward a fixed bracket 204 by means of a piston 218 of a pneumatic cylinder 217 to which a certain pneumatic pressure is applied.

In the foregoing first to third embodiments, when the nip pressure between a pair of belts is reduced, a bracket supporting one belt is brought close to another bracket supporting the other belt so as to enhance the reduced nip pressure. In embodiments described hereinafter, by expanding the space between a pair of pulleys supporting one belt, the tension on the belt is increased and as a result, the nip pressure between a pair of belts which are crossed in such a state that the surfaces of the two belts are contacted with each other is enhanced.

In a fourth embodiment illustrated in FIG. 5, bearing members 321 and 322 supporting a pair of pulleys 319 and 320 between which a belt 301 is laid out are disposed so that they can be brought close to each other or be separated from each other. A guiding bar 323 and a piston 324 are mounted on the bearing member 321 supporting the pulley 319. The bar 323 is fitted in a guide hole 325 formed on the bearing member 322 and the piston 324 is fitted in a cylinder 327 mounted on the bearing member 322. The cylinder 327 is communicated with a pressure source disposed outside the nip pressure setting apparatus through a conduit 326. When the nip pressure between the belts 301 and 302 is reduced, an additional pressure is supplied to the cylinder 321 from the external pressure source (not shown) to increase the pressure in the cylinder 327 and shift the bearing member 321 so that it is separated from the bearing member 322, whereby the space between the pulleys 319 and 320 is expanded, the tension on the belt 301 is increased, and the nip pressure between the belts 301 and 302 is enhanced.

Figure 6:
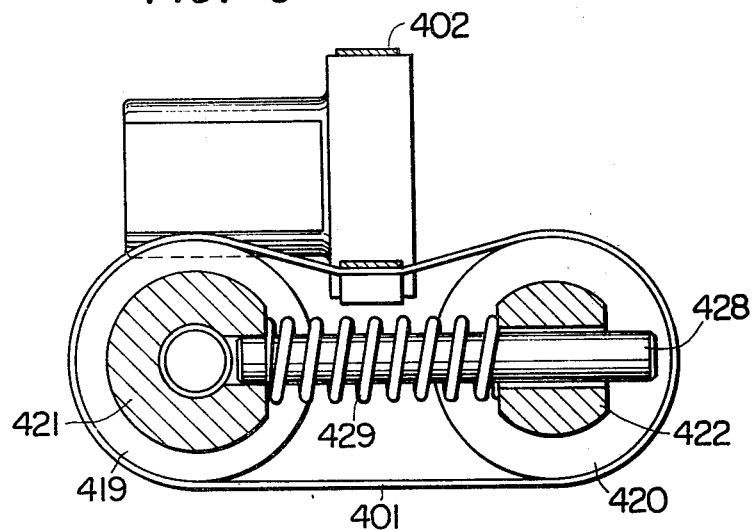
FIG. 6 is a sectional view showing the main part of a fifth embodiment of the apparatus of the present invention.

In a fifth embodiment illustrated in FIG. 6, bearing members 421 and 422 supporting a pair of pulleys 419 and 420 between which a belt 401 is laid out are always urged by a spring 429 in a direction separating the bearing members 421 and 422 from each other. More specifically, a rod 428 is fixed to the bearing member 421, and the spring 429 and bearing member 420 are slidably fitted on the rod 428. In order to lay out the belt 401 between the pulleys 419 and 420, the belt 401 always undergoes an elastice repulsing force of the spring 429. As shown in FIG. 6, the belts 401 and 402 are crossed so that the surfaces of these belts are contacted with each other to form a nip point. When the nip pressure at this nip point is reduced by abrasion of the surfaces of the belts 401 and 402 owing to this contact, the spring 429 is elongated in a quantity corresponding to this reduction to increase the space between the pulleys 419 and 420, whereby the nip pressure can be maintained at the predetermined level constantly.

Figure 7:
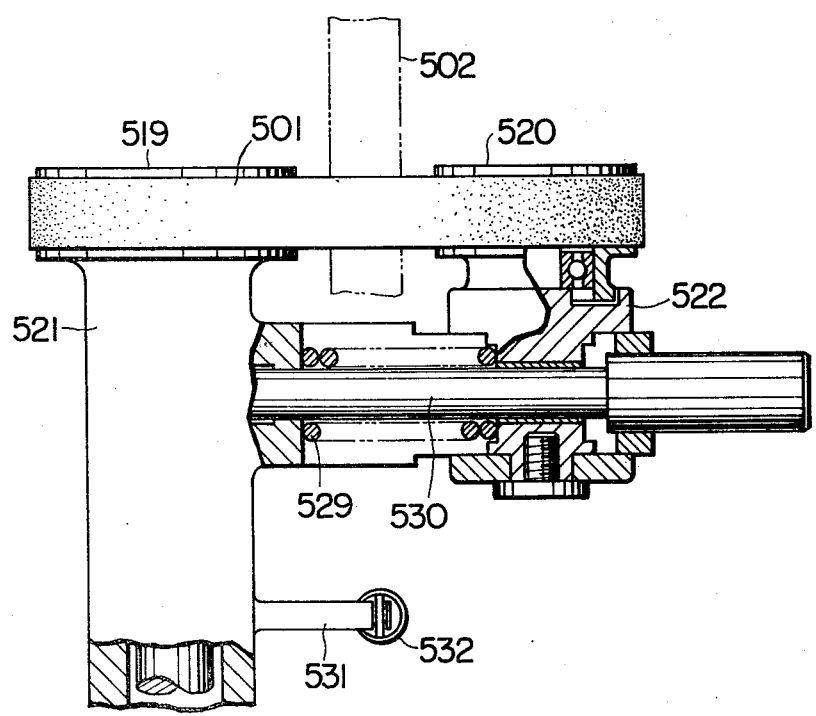
FIG. 7 is a sectional view showing the main part of a sixth embodiment of the apparatus of the present invention.

A sixth embodiment illustrated in FIG. 7 is different from the foregoing embodiments in the point that of a pair of pulleys supporting a belt, one pulley can freely turn with a bearing member of the other pulley being as the center. More specifically, a belt 501 is laid out between pulleys 519 and 520, and a bearing member 522 supporting the pulley 520 is slidably fitted in a handle 530 mounted on another bearing member 521 supporting the pulley 519, and the pulley 520 is always urged in a direction separating from the pulley 519 by a spring 529 to apply a certain tension onto the belt 501. The bearing member 521 is supported by a supporting member (not shown) so that it can turn with the central line thereof being as the axis of turning, and a spring 532 is hung on an arm 531 integrated with the bearing member 521 so that the bearing member 521 is turned in a direction perpendicular to the sheet face of FIG. 7 by said spring 532. By the turning movement of the bearing member 521, the belt 501 presses the belt 502 to produce a certain nip pressure therebetween. When the surfaces of the belts 501 and 502 are worn by running contact between the surfaces of the belts 501 and 502 and the nip pressure is reduced, the belt 501 is pressed to the belt 502 by the repulsive force of the spring 532 through the arm 531, bearing member 521 and handle 530 according to the degree of reduction of the nip pressure.

What is claimed is:

1. A nip pressure setting apparatus for a false twister in which a yarn is nipped and false-twisted between a pair of belts running in opposite directions including a pair of belts being crossed and contacted with each other and a device for setting the belts so as to be able to compensate variations of a nip pressure of the belts to maintain the nip pressure at a predetermined level wherein a fixed bracket supporting a pair of pulleys between which one of said belts is laid out is disposed in a dovetail groove in the fixed state, and a movable bracket supporting a pair of pulleys between which another belt running in a direction opposite to the running direction of the former is slidably disposed in said dovetail groove so that both the belts are crossed to bring about a pressing contact therebetween.

2. A nip pressure setting apparatus for a false twister in which a yarn is nipped and false-twisted between a pair of belts in opposite directions including a pair of belts being crossed and contacted with each other and a device for setting the belts so as to be able to compensate variations of a nip pressure of the belts to maintain the nip pressure at a predetermined level wherein of a pair of pulleys supporting one of said belts of the false twister for false-twisting a yarn by nipping the yarn between belts running in opposite directions, one pulley is arranged so that a bearing member of said one pulley can turn with a bearing member of the other pulley being as the center of turning.

3. Structure for nipping and false twisting yarn comprising a pair of endless belts extending perpendicularly to each other and in engagement with each other centrally thereof, means driving the belts in opposite directions and adjustable means for varying the pressure between the belts at their point of contact to vary the nip pressure of yarn passed between the belts at the intersection thereof for maintaining the nip pressure at a predetermined level.

4. Structure as set forth in claim 3 wherein the means for varying the pressure between the belts comprises means for moving one of the belts toward and away from the other.

5. Structure as set forth in claim 4 wherein the means for moving one of the belts toward and away from the other comprises means for pivoting one of the belts about one end thereof.

6. Structure as set forth in claim 3 wherein the means for varying the pressure between the belts comprises means for moving the ends of at least one of the belts. away from the other.

* * * * *